(12) United States Patent
Minami et al.

(10) Patent No.: US 8,298,708 B2
(45) Date of Patent: Oct. 30, 2012

(54) LITHIUM SECONDARY BATTERY

(75) Inventors: Hiroshi Minami, Kobe (JP); Naoki Imachi, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 301 days.

(21) Appl. No.: 12/718,166

(22) Filed: Mar. 5, 2010

(65) Prior Publication Data

US 2010/0248035 A1 Sep. 30, 2010

(30) Foreign Application Priority Data

Mar. 31, 2009 (JP) ................................. 2009-084027

(51) Int. Cl.
*H01M 4/13* (2010.01)
(52) U.S. Cl. .................... 429/231.95; 429/213; 429/217; 429/218.1; 429/231.8

(58) Field of Classification Search ............. 429/231.95, 429/213, 217, 218.1, 231.8
See application file for complete search history.

(56) References Cited

U.S. PATENT DOCUMENTS 6,001,139 A * 12/1999 Asanuma et al. ............ 29/623.3
2007/0072083 A1 3/2007 Ikuta et al.

FOREIGN PATENT DOCUMENTS

WO 2005/057691 A1 6/2005
* cited by examiner

*Primary Examiner* — Edward Cain
(74) *Attorney, Agent, or Firm* — Westerman, Hattori, Daniels & Adrian, LLP

(57) ABSTRACT

A negative electrode mixture layer containing CMC and a hydroxy group-modified PVP. The mass ratio of CMC is greater than that of the hydroxy group-modified PVP. The hydroxy group-modified PVP has low affinity with a solvent for a solvent-system slurry that forms an inorganic particle layer. Adhesion strength is prevented from degrading after forming the inorganic particle layer on the negative electrode mixture layer.

6 Claims, No Drawings

LITHIUM SECONDARY BATTERY

BACKGROUND OF THE INVENTION

1. Field of the Invention

The present invention relates to lithium secondary batteries.

2. Description of Related Art

Lithium secondary batteries have been adopted for various applications ranging from small-sized mobile devices, such as mobile telephones, notebook computers, gaming devices, and DSCs (Digital Still Cameras), to large-sized applications, such as power tools, power assisted bicycles, electric scooters, HEVs (Hybrid Electric Vehicles), and EVs (Electric Vehicles). Accordingly, much research and development efforts have been invested to obtain lithium secondary batteries with higher capacity and higher power.

Conventionally, alkaline aqueous electrolyte batteries, such as nickel-cadmium batteries and nickel-metal hydride batteries, which are relatively safe, have been used for high-power applications, so the lithium secondary batteries used for high-power applications need to have the same level of safety. It is therefore imperative to develop a high capacity and highly safe lithium secondary battery.

As a means for increasing the safety of a lithium secondary battery, Published PCT Application WO 2005/057691 A1 (Patent Document 1) describes that insulation performance between the positive and negative electrodes by providing a layer containing inorganic particles (hereinafter referred to as an "inorganic particle layer") on the electrodes or the separator to prevent internal short circuits caused by foreign objects driving from the manufacturing process and the source materials

BRIEF SUMMARY OF THE INVENTION

In the case of forming the inorganic particle layer on the negative electrode, the inorganic particle layer is formed after the formation of a negative electrode mixture layer. For this reason, it is impossible to prepare a slurry for the negative electrode mixture layer and a slurry the inorganic particle layer using the same solvent. If the same solvent is used, the negative electrode mixture layer may peel off from the current collector, and it becomes difficult to control the amount of the mixture applied.

Taking environmental load and costs into consideration, it is preferable to form the negative electrode mixture layer from a water-system slurry, while it is preferable to form the inorganic particle layer using from solvent-system slurry. For this reason, it is preferable to use SBR (styrene-butadiene rubber), CMC (carboxymethylcellulose), or the like as a binder agent of the negative electrode mixture layer and NMP (N-methylpyrrolidone) or the like as a solvent of a solvent-system slurry for forming the inorganic particle layer.

SBR has high affinity with NMP. For this reason, in the case that NMP is used as the solvent of the solvent-system slurry for forming the inorganic particle layer, NMP infiltrates into the negative electrode mixture layer, causing SBR to swell. As a consequence, the adhesion strength between the current collector and the negative electrode mixture layer becomes poor. This may cause problems in the subsequent manufacturing steps, such as an electrode winding process, leading to problems in product quality.

On the other hand, CMC has low affinity with NMP. The CMC and SBR in the negative electrode mixture layer forms a composite film on the surface of the negative electrode active material, imparting adhesion strength. This is believed to be because the amount of NMP absorbed by SBR is reduced due to CMC.

However, even when CMC and SBR are used at the same time, the adhesion strength after the formation of the inorganic particle layer is poorer than that before the formation of the inorganic particle layer.

The present invention provides a lithium secondary battery comprising a non-aqueous electrolyte, a positive electrode, and a negative electrode having a negative electrode mixture layer and an inorganic particle layer formed on the negative electrode mixture layer, the negative electrode mixture layer containing CMC and a hydroxy group-modified polyvinyl pyrrolidone (hydroxy group-modified PVP), and the mass ratio of the CMC contained being greater than that of the hydroxy group-modified PVP.

When the negative electrode mixture layer contains CMC and a hydroxy group-modified PVP, the adhesion strength between the current collector and the negative electrode mixture layer can be improved.

Moreover, in the present invention, the mass ratio of the CMC contained in the negative electrode mixture layer is greater that that of the hydroxy group-modified PVP. As a result, it is possible to improve the adhesion strength and obtain a higher capacity. When the content of the CMC is less than that of the hydroxy group-modified PVP, it is difficult to increase the adhesion strength, and in addition, coatability of the water-system slurry for forming the negative electrode mixture layer becomes poor, making it difficult to coat the slurry into a thick film.

The hydroxy group-modified PVP is one in which a hydroxy group, which has low affinity with the solvent (NMP) for the solvent-system slurry for forming the inorganic particle layer, is introduced in the structure of polyvinyl pyrrolidone (PVP), so it is not affected by NMP easily. It is believed that swelling of a substance with high affinity with the solvent of the solvent-system slurry can also be lessened by containing the hydroxy group-modified PVP in the negative electrode mixture layer. As a result, a negative electrode plate with good quality can be obtained.

Examples of the hydroxy group-modified PVP include copolymers of N-vinylpyrrolidone (NVP) and a hydroxy group-containing acrylate, such as 2-hydroxyethyl(meth)acrylate, hydroxypropyl(meth)acrylate, hydroxybutyl(meth)acrylate, and 2-hydroxyethoxyethyl(meth)acrylate, and copolymers of vinyl acetate and NVP. Among the hydroxy group-containing acrylates, 2-hydroxyethyl acrylate is particularly preferable since it has a large number of hydroxy groups contained per unit so that it can form a copolymer with vinylpyrrolidone easily.

With a negative electrode in which an inorganic particle layer is formed on the negative electrode mixture layer, the present invention makes it possible to prevent the adhesion strength between the current collector and the negative electrode mixture layer from degrading after the formation of the inorganic particle layer. By using such a negative electrode, the safety of the lithium secondary battery can be improved.

DETAILED DESCRIPTION OF THE INVENTION

Hereinbelow, the present invention is described in further detail based on examples thereof. It should be construed, however, that the present invention is not limited to the following examples. Various changes and modifications are possible without departing from the scope of the invention.

1. Preparation of Negative Electrode

First, CMC [product name: 1380 (degree of etherification: 1.0 to 1.5) made by Daicel Chemical Industries, Ltd.] was dissolved in deionized water using a mixer (made by Primix Corp. under the trade name "HOMOMIXER"), to obtain a CMC aqueous solution with a concentration of 1.0 mass %. Also, a PVP compound was dissolved in deionized water using the HOMOMIXER to obtain a PVP compound aqueous solution with a concentration of 1.0 mass %.

Then, artificial graphite (average particle size: 21 μm, surface area: 4.0 m$^2$/g) was mixed at a predetermined solid content with the PVP compound aqueous solution and the CMC aqueous solution, using a mixer called HIVIS MIX (made by Primix Corp.) under the conditions of 90 rpm×60 min. After adding the remaining PVP compound aqueous solution and CMC aqueous solution, the mixture was further mixed under the conditions of 90 rpm×20 min. The type of the PVP compound and the ratio of the PVP compound aqueous solution and the CMC aqueous solution are different in different Examples and Comparative Examples.

Then, SBR (solid content: 50 mass %) was added to the aqueous solution in which the PVP compound and CMC were mixed, and the resultant mixture was mixed with the HIVIS MIX under the conditions of 40 rpm×45 min. Then, deionized water was further added to control the viscosity, whereby a water-system slurry was prepared. The mass ratio of graphite: the mixture of CMC and the PVP compound:SBR was adjusted to be 98:1:1.

Next, the resultant water-system slurry was applied onto both sides of a copper foil used as a current collector, and the resultant material was then dried and calendered so that the filling density became 1.60 g/cc. Thereby, a negative electrode plate in which a negative electrode mixture layer was formed on the current collector was prepared. The target value of the amount of the water-system slurry applied was set at 204 mg/10 cm$^2$, and the capacity ratio of the positive and negative electrodes was controlled to be negative electrode-rich at 1.10.

It is preferable that the amount of the mixture of the CMC and the PVP compound be from 0.2 mass % to 2.0 mass %, more preferably from 0.5 mass % to 1.5 mass %, with respect to the amount of the water-system slurry. If the amounts of these substances are too large, lithium-ion intercalation and deintercalation with the negative electrode active material are inhibited.

SBR, which is a latex-system polymer, is suitable as a binder agent. Although the CMC and the PVP compound has binding capability in addition to thickening effect, they lack flexibility. Therefore, they cannot be used as a binder agent for the lithium secondary battery, in which the negative electrode active material undergoes large expansion and shrinkage during charge and discharge. For this reason, SBR is added. Since the addition of an excessive amount of SBR inhibits lithium-ion intercalation and deintercalation with the negative electrode active material, it is desirable that the amount of SBR added be from 0.5 mass % to 2.0 mass %, more desirably from 0.5 mass % to 1.5 mass %.

Although artificial graphite is employed as the negative electrode active material, it is also possible to use other materials that are capable of intercalating and deintercalating lithium ions, such as graphite, coke, tin oxide, metallic lithium, silicon, and mixtures thereof.

2. Preparation of Inorganic Particle Layer

Titanium oxide (TiO$_2$, made by Ishihara Sangyo Co., Ltd., under the trade name of CR-EL, rutile structure, average particle size: 0.25 μm) was used as the inorganic particles. Using NMP as a solvent, TiO$_2$ and PVdF (polyvinylidene fluoride) were prepared so that the solid content became 30 mass %, and the mixture was subjected to a mixing and dispersing process (40 mm/s×30 sec.×3 times) using a FILMICS mixer (made by Primix Corp.), to prepare a solvent-system slurry. The amount of the PVdF was set at 3.0 mass % with respect to the TiO$_2$.

After coating the solvent-system slurry onto the negative electrode mixture layer using a gravure coater, the NMP was removed by drying, to form an inorganic particle layer. Thus, a negative electrode was obtained. The solvent-system slurry was coated on one side at a time so that the entire surfaces on which the negative electrode mixture layer was coated. The coating thickness of the inorganic particle layer is 3 μm per one side.

Examples of the inorganic particles that can be used include alumina, zirconia, and magnesia, other than TiO$_2$. However, it is preferable that the TiO$_2$ has a rutile structure. The anatase-type titania is capable of insertion and deinsertion of lithium ions. Therefore, depending on the surrounding atmosphere and/or the potential, it can absorb lithium ions and exhibit electron conductivity. Consequently, there is a risk of capacity degradation and short circuiting.

Although not particularly limited, it is desirable that the thickness of the inorganic particle layer be 5 μm or less per one side, taking the insulation effect and the influence on the volumetric density into consideration. It is preferable that the average particle size of the inorganic particles be 1 μm or less, because if the particle size of the inorganic particles is too large, the inorganic particle layer becomes too thick.

The material for the binder agent used for the inorganic particle layer need to satisfy the following characteristics comprehensively: (1) ensuring the dispersion capability of the inorganic particles (preventing re-aggregation), (2) ensuring the adhesion capability to withstand the manufacturing process of the battery, and (3) filling the gaps between the inorganic particles due to the swelling after absorbing the electrolyte solution. In addition, in order to ensure sufficient battery performance, it is preferable that these effects can be obtained with a small amount of binder agent. Accordingly, it is preferable that the amount of the binder agent added be 10 mass % or less, more preferably 5 mass % or less, with respect to the total amount of the inorganic particles and the conductive substances. Preferable examples of the material include PTFE (polytetrafluoroethylene), PAN (polyacrylonitrile), SBR and modified substances and derivatives thereof, copolymers containing acrylonitrile units, and polyacrylic acid derivatives. A copolymer containing acrylonitrile units is particularly preferable because it can satisfy the foregoing characteristics (1) or (3) with a small amount, and also from the viewpoints of the dispersion capability of the solvent-system slurry.

As the solvent of the solvent-system slurry, it is possible to use a solvent in which the binder agent can be dissolved, other than the NMP.

A suitable method for dispersing the solvent-system slurry is a wet-type dispersion method, such as a bead-mill method and a roll-mill method, in addition to the above-mentioned method using the FILMICS mixer. In particular, since the particle size of the inorganic particles used is small, sedimentation of the solvent-system slurry is significant and it is unable to form a uniform film unless the slurry is subjected to a mechanical dispersion process, and a uniform film cannot be formed. For this reason, a method for dispersing a paint used in the paint industry is desirable.

Examples of the method of coating the inorganic particles onto the negative electrode mixture layer include die coating, dip coating, curtain coating, and spray coating, in addition to the gravure coating.

3. Preparation of Positive Electrode

Using lithium cobalt oxide as the positive electrode active material, the positive electrode active material, acetylene black as a carbon conductive agent, and PVdF were mixed at a mass ratio of 95:2.5:2.5, to obtain a positive electrode mixture. NMP was added as a solvent to the positive electrode mixture, and the mixture was agitated using a COMBIMIX mixer (made by Primix Corp.), to prepare a positive electrode slurry. This was coated onto both sides of an aluminum foil, and then dried and calendered, to prepare a positive electrode.

The method for mixing the positive electrode mixture is not limited to the wet-type mixing method such as the above-described method using a COMBIMIX mixer. It is possible to employ a method in which a positive electrode active material and a conductive agent are dry-blended and thereafter PVDF and NMP are mixed therewith and agitated together.

The positive electrode active material is not limited to lithium cobalt oxide. It is possible to use other lithium composite oxides containing cobalt or manganese, such as lithium cobalt-nickel-manganese oxide, lithium aluminum-nickel-manganese oxide, and lithium aluminum-nickel-cobalt oxide.

4. Preparation of Non-Aqueous Electrolyte

A non-aqueous electrolyte solution was prepared in the following manner. $LiPF_6$ as a solute was dissolved at a concentration of 1 mole/liter into a mixed solvent of 3:7 volume ratio of ethylene carbonate (EC) and diethyl carbonate (DEC).

The solvent of the non-aqueous electrolyte used in the present invention may be any solvent that has conventionally been used as a solvent for a non-aqueous electrolyte of lithium secondary batteries. Particularly preferable is a mixed solvent of a cyclic carbonate and a chain carbonate.

Examples of the cyclic carbonate include ethylene carbonate, propylene carbonate, butylene carbonate, and vinylene carbonate. Examples of the chain carbonate include dimethyl carbonate, methyl ethyl carbonate, and diethyl carbonate. It is also possible to use a mixed solvent of a cyclic carbonate and an ether-system solvent such as 1,2-dimethoxyethane or 1,2-diethoxyethane.

Examples of the usable solute in the non-aqueous electrolyte include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. Preferable examples include $LiXF_y$ (wherein X is P, As, Sb, B, Bi, Al, Ga, or In, and y is 6 when X is P, As, or Sb or y is 4 when X is B, Bi, Al, Ga, or In), lithium perfluoroalkylsulfonic imide $LiN(C_mF_{2m+1}SO_2)(C_nF_{2n+1}SO_2)$ (wherein m and n denote, independently of one another, an integer of from 1 to 4), lithium perfluoroalkylsulfonic methide $LiC(C_pF_{2p+1}SO_2)(C_qF_{2q+1}SO_2)(C_rF_{2r+1}SO_2)$ (wherein p, q, and r denote, independently of one another, an integer of from 1 to 4), and mixtures thereof.

Examples of the usable non-aqueous electrolyte include gelled polymer electrolytes in which an electrolyte solution is impregnated in a polymer electrolyte such as polyethylene oxide or polyacrylonitrile, and inorganic solid electrolytes such as LiI and $Li_3N$.

There is no limitation to the electrolyte of the lithium secondary battery, and any type of electrolyte may be used as long as the lithium compound used as the solute for providing ionic conductivity, and the solvent used for dissolving and retaining the solute are not decomposed at a voltage during charge and discharge or during the storage of the battery.

5. Construction of Battery

Lead terminals were attached to the positive electrode and the negative electrode, and they were spirally wound with separators interposed therebetween. The wound electrodes were pressed to prepare an electrode assembly. The electrode assembly pressed into a flat shape was placed into a battery case made of aluminum laminate, and the non-aqueous electrolyte was filled therein. Then, the battery case was sealed to prepare a test battery. The test battery had a design capacity of 850 mAh. The design capacity of the battery was determined with reference to an end-of-charge voltage of 4.4 V (positive electrode potential: 4.5 V (vs. $Li/Li^+$)).

Example 1

In Example 1, a hydroxy group-modified PVP was used as the PVP compound, and the negative electrode plate was prepared at a mass ratio of the hydroxy group-modified PVP: CMC=40:60. Then, the inorganic particle layer was formed on the negative electrode plate to prepare a negative electrode t1. Then, using the negative electrode t1, a battery T1 was prepared.

The hydroxy group-modified PVP was prepared in the following manner.

28.2 mass % of ion exchange water, 12.1 mass % of isopropyl alcohol (IPA), and 1 mass % of N-vinylpyrrolidone (NVP) were put into a glass polymerization vessel in which a cooling pipe, a nitrogen introducing line, and a thermometer were installed, and while agitating the mixture, nitrogen was introduced therein to effect nitrogen substitution for the system. After the internal temperature of the polymerization vessel was elevated using an oil bath to 80° C. (polymerization temperature), a monomer solution (solution A) in which 18.2 mass % of NVP and 10.2 mass % of ion exchange water were mixed, an initiator solution in which 0.36 mass % of dimethyl-2,2'-azobisisobutyrate (made by Wako Pure Chemical Industries, Ltd., "V601") was mixed and dissolved in 3.2 mass % of IPA, and 4.84 mass % of 2-hydroxyethyl acrylate (HEA) (solution B) were dropped into the vessel for 2 hours. Thereafter, the temperature was elevated and distillation was started. Then, distillation was carried out for 5 hours while putting an initiator solution in which 29.2 mass % of ion exchange water and 0.07 mass % of dimethyl-2,2'-azobisisobutyrate were mixed and dissolved in 0.6 mass % of IPA into the polymerization vessel in three times before the distillation amount reached 29.2 mass %, to obtain a hydroxy group-modified PVP aqueous solution. The resultant hydroxy group-modified PVP aqueous solution was clear and colorless, and the solid content was 30.2%. The K value of the hydroxy group-modified PVP in the aqueous solution was 28.6.

It is preferable that the K value of the hydroxy group-modified PVP be within the range of from 10 to 90. If the K value is less than 10, it is difficult to obtain a water-system slurry with high dispersion stability. On the other hand, if the K value is greater than 90, the viscosity of the water-system slurry is too high, and the problems such as difficult handling can arise.

K value can be determined by Eq. 1 below. Eq. (1) is the formula commonly referred to as the Fikentscher formula, (Fikentscher). The K value represents the degree of polymerization, and it correlates with the molecular weight. In Eq. (1), η is the relative viscosity of the PVP aqueous solution with respect to water, and c is the concentration (%) of PVP in the PVP aqueous solution.

$$K=(1.5 \log \eta-1)/(0.15+0.003c)+(300c \log \eta+(c+1.5c \log \eta)^2)^{1/2}/0.15c+0.003c^2) \quad \text{Eq. (1)}$$

Example 2

In Example 2, the hydroxy group-modified PVP of Example 1 was used as the PVP compound, and a negative electrode plate was prepared at a mass ratio of the hydroxy group-modified PVP:CMC=20:80. Then, the inorganic particle layer was formed on the negative electrode plate to prepare a negative electrode t2. Then, using the negative electrode t2, a battery T2 was prepared.

Example 3

In Example 3, the hydroxy group-modified PVP of Example 1 was used as the PVP compound, and a negative electrode plate was prepared at a mass ratio of the hydroxy group-modified PVP:CMC=5:95. Then, the inorganic particle layer was formed on the negative electrode plate to prepare a negative electrode t3. Then, using the negative electrode t3, a battery T3 was prepared.

Comparative Example 1

In Comparative Example 1, the negative electrode plate was prepared at a mass ratio of the PVP compound:CMC=0:100. In other words, the negative electrode mixture layer does not contain the PVP compound. Then, a negative electrode r1 was prepared in which the inorganic particle layer was formed on the negative electrode plate.

Then, using a negative electrode plate on which the inorganic particles were not yet formed, a battery R1 was prepared. In addition, using the negative electrode r1, a battery R2 was prepared.

Comparative Example 2

In Comparative Example 2, PVP (made by Nippon Shokubai Co., Ltd., K value: 35) was used as the PVP compound, and a negative electrode plate was prepared at a mass ratio of the PVP:CMC=100:0. The resulting electrode plate was used as a negative electrode r2. In other words, the negative electrode mixture layer does not contain CMC.

With the negative electrode r2, the water-system slurry had poor dispersion capability, so the slurry could not been coated at the target amount. Therefore, a battery could not be prepared using the negative electrode r2.

Comparative Example 3

In Comparative Example 3, the hydroxy group-modified PVP of Example 1 was used as the PVP compound, and a negative electrode plate was prepared at a mass ratio of the PVP:CMC=100:0. The resulting electrode plate was used as a negative electrode r3. In other words, the negative electrode mixture layer does not contain CMC.

With the negative electrode r3, the water-system slurry had poor dispersion capability, so the slurry could not been coated at the target amount. Therefore, a battery could not be prepared using the negative electrode r3.

Comparative Example 4

In Comparative Example 4, the hydroxy group-modified PVP of Example 1 was used as the PVP compound, and a negative electrode plate was prepared at a mass ratio of the PVP:CMC=50:50. The resulting electrode plate was used as a negative electrode r4.

With the negative electrode r4, the water-system slurry had poor dispersion capability, so the slurry could not been coated at the target amount. Therefore, a battery could not be prepared using the negative electrode r4.

Comparative Example 5

In Comparative Example 5, PVP (made by Nippon Shokubai Co., Ltd., K value: 35) was used as the PVP compound, and a negative electrode plate was prepared at a mass ratio of the PVP:CMC=20:80. The resulting electrode plate was used as a negative electrode r5.

The inorganic particle layer was formed on the negative electrode plate, but peeling of the negative electrode mixture layer was observed. Therefore, a battery using the negative electrode r5 could not be prepared.

Comparative Example 6

In Comparative Example 6, a carboxylic acid-modified PVP was used as the PVP compound, and a negative electrode plate was prepared at a mass ratio of the PVP:CMC=20:80. The resulting electrode plate was used as a negative electrode r6.

The inorganic particle layer was formed on the negative electrode plate, but peeling of the negative electrode mixture layer was observed. Therefore, a battery using the negative electrode r6 could not be prepared.

The carboxylic acid-modified PVP was prepared in the following manner.

40 mass % of polyvinyl pyrrolidone (made by Nippon Shokubai Co., Ltd., K value: 28) and 139 mass % of ion exchange water were put into a glass polymerization vessel in which a cooling pipe, a nitrogen introducing line, and a thermometer were installed, and after nitrogen was introduced therein to effect nitrogen substitution for the system, the mixture was agitated to dissolve the solute to prepare a uniform solution. Thereafter, the temperature was elevated until the resultant solution became a refluxed state. The internal temperature of the vessel was 103° C. Next, 12.5 mass % of a 80% acrylic acid aqueous solution, 11.8 mass % of a 10% ammonia aqueous solution, and 2.7 mass % of a 15% ammonium persulfate aqueous solution were dropped into the vessel for 90 minutes. After completing the dropping, aging was carried out for 2 hours while keeping the internal temperature of the vessel. During the aging, 0.5 mass % of a 15% ammonium persulfate aqueous solution was added thereto in two times, to thus obtain a carboxylic acid-modified PVP. The K value of the carboxylic acid-modified PVP was 44.3. The conversion ratio of acrylic acid was found to be 97.3% by liquid chromatography.

6. Evaluation of Coatability of Water-System Slurry

The coatability of the water-system slurry was evaluated by visual observation according to the following standard. The results are shown in Table 1.

Good: No streak or no uncoated portion is observed in the coated surface.

Fair: No uncoated portion is observed but streaks are observed in the coated surface.

Poor: An uncoated portion is observed in the coated surface.

7. Adhesion Strength of Negative Electrode: 90-Degree Peeling Test

A negative electrode plate or a negative electrode with dimensions of 100 mm×25 mm was affixed to an acrylic board size with dimensions of 120 mm×30 mm by a 70 mm×20 mm double-sided tape (NAISTAK NW-20 made by Nichiban Co., Ltd.). Using a small-sized portable test stand (FGS-TV or FGP-5 made by Nidec-Shimpo Corp.), one end of the negative electrode plate or the negative electrode was pulled 50 mm upward in a direction at an angle of 90 degrees to the electrode affixed surface, at a constant rate (100 mm/min.), to measure the peel strength (mN/cm). The measurement of the peel strength was performed for each sample of Examples and Comparative Examples above. The mean values and adhesion retention ratios (%) are shown in Table 1.

In Table 1, the peel strength before formation of the inorganic particle layer refers to the peel strength of the negative electrode plate, and the peel strength after formation of the inorganic particle layer refers to the peel strength of the negative electrode. The higher the peel strength is, the higher the adhesion strength.

The adhesion retention ratio refers to the percentage of the peel strength retained after the formation of the inorganic particle layer. The higher the adhesion retention ratio is, the less the degradation of the peel strength after the formation of the inorganic particle layer.

8. Battery Performance Evaluation

A charge-discharge test was conducted for the test batteries at 25° C. In the charge test, each of the test batteries was charged at a constant current of 1 It (850 mA) to a battery voltage of 4.4 V and further charged at a constant voltage of 4.4 V until the current became 0.05 It (42.5 mA). After the charge test, each battery was rested for 10 minutes and thereafter subjected to a discharge rate test. In the discharge rate test, each of the test batteries was discharged at a constant current of 1 It or 3 It until the battery voltage became 2.75 V.

Using the discharge capacity at 3 It and the discharge capacity at 1 It, discharge rate ratio (%) was determined by Eq. (2). The results are shown in Table 2.

Discharge rate ratio(%)=(Discharge capacity at 3 It/Discharge capacity at 1 It)×100   Eq. (2)

9. Analysis (1) An analysis was made for the coatability of the water-system slurry.

For the negative electrodes t1 to t3 and r1, no uncoated portion or streak was observed in the coated surface, indicating that their coatability was good. For the negative electrodes r5 and r6, which used mixtures of PVP compounds other than the hydroxy group-modified PVP, no uncoated portion was observed in the coated surface, but streaks were observed. The negative electrode r2, which used PVP alone, the negative electrode r3, which used the hydroxy group-modified PVP alone, and the negative electrode r4, in which hydroxy group-modified PVP:CMC=50:50, showed poor dispersion capability of the water-system slurry, so the target amount of the slurry could not be coated.

From the results for the negative electrodes t1 to t3, r1, r3, and r4, it is demonstrated that the negative electrodes that contains CMC in a greater mass ratio than that of the hydroxy group-modified PVP show better coatability. In other words, the negative electrodes using only PVP compounds, like the negative electrodes r2 and r3, and the negative electrode that contains CMC and the hydroxy group-modified PVP in the same mass ratio show poor coatability.

From the results for the negative electrodes t2, r5, and r6, it is demonstrated that among them, only the negative electrode t2, which contained the hydroxy group-modified PVP, exhibited good coatability.

Therefore, it is demonstrated that a water-system slurry with good coatability can be obtained when the negative electrode mixture layer contains CMC and a hydroxy group-modified PVP and the mass ratio of the CMC contained is greater than that of the hydroxy group-modified PVP.

(2) An analysis of the adhesion strength between the current collector and the negative electrode mixture layer is below.

Both before and after the formation of the inorganic particle layer, the adhesion strengths of the negative electrodes t1 to t3 were higher than that of the negative electrode r1. The adhesion strengths of the negative electrodes t1 to t3 after the formation of the inorganic particle layer were higher than that of the negative electrode r1 before the formation of the inor-

TABLE 1

| Negative electrode | PVP compound/CMC | Various PVP:CMC | Coatability | Peeling strength (Adhesion strength) [mN/cm] | | Adhesion retention ratio |
|---|---|---|---|---|---|---|
| | | | | Before formation of inorganic particle layer | After formation of inorganic particle layer | |
| t1 | Hydroxy group-modified PVP/CMC | 40:60 | Good | 105 | 78 | 74% |
| t2 | Hydroxy group-modified PVP/CMC | 20:80 | Good | 135 | 97 | 72% |
| t3 | Hydroxy group-modified PVP/CMC | 5:95 | Good | 98 | 68 | 69% |
| r1 | CMC | 0:100 | Good | 49 | 28 | 57% |
| r2 | PVP | 100:0 | Poor | Unable to prepare battery | | — |
| r3 | Hydroxy group-modified PVP | 100:0 | Poor | Unable to prepare battery | | — |
| r4 | Hydroxy group-modified PVP/CMC | 50:50 | Poor | Unable to prepare battery | | — |
| r5 | PVP/CMC | 20:80 | Fair | 127 | Peeled | — |
| r6 | Carboxylic acid-modified PVP/CMC | 20:80 | Fair | 126 | Peeled | — | ganic particle layer. This means that the adhesion strength can be improved by adding the hydroxy group-modified PVP to the negative electrode mixture layer.

In addition, the negative electrodes t1 to t3 exhibited higher adhesion retention ratios than that of the negative electrode r1. Therefore, it is demonstrated that the degradation in the adhesion strength after the formation of the inorganic particle layer can be lessened when the negative electrode mixture layer contains CMC and a hydroxy group-modified PVP and the mass ratio of the CMC contained is greater than that of the hydroxy group-modified PVP.

(3) An analysis of the PVP compounds is below.

In each of the negative electrodes r5 and r6, the negative electrode mixture layer peeled off from the current collector after forming the inorganic particle layer. It is believed that because PVP and the carboxylic acid-modified PVP have high affinity with NMP, the NMP used for forming the inorganic particle layer infiltrated into the negative electrode mixture layer, causing the SBR, the PVP, and the carboxylic acid-modified PVP to be swelled with the NMP.

In contrast, in the negative electrode t2 that contained CMC at the same ratio as in the negative electrodes r5 and r6, the negative electrode mixture layer did not peel off even after the formation of the inorganic particle layer. The reason is believed to be that because the hydroxy group-modified PVP has low affinity with NMP, the hydroxy group-modified PVP itself was not swelled with NMP, and moreover, the swelling of SBR was also inhibited.

(4) An analysis of CMC is below.

Although the negative electrode r1 exhibited good coatability, it showed a poorer adhesion strength before and after the formation of the inorganic particle layer and a lower adhesion retention ratio than those of the negative electrodes t1 to t3. The reason is believed to be that since the adsorbing strength of CMC to the negative electrode active material is low, a portion in which the CMC does not adsorb remains in the surface of the negative electrode active material particle.

(5) An analysis of the negative electrode r3 is below.

The negative electrode r3 showed poor coatability. The reason is believed to be that since the adsorbing strength of the hydroxy group-modified PVP to the negative electrode active material is high, one molecule of the hydroxy group-modified PVP is adsorbed to only one negative electrode active material particle, and it is not easily adsorbed to a plurality of negative electrode active material particles.

TABLE 2

| Battery | PVP compound/CMC | Various PVP:CMC | Discharge rate ratio [%] |
|---|---|---|---|
| T1 | Hydroxy group-modified PVP/CMC | 40:60 | 31 |
| T2 | Hydroxy group-modified PVP/CMC | 20:80 | 34 |
| T3 | Hydroxy group-modified PVP/CMC | 5:95 | 34 |
| R1 | CMC | 0:100 | 35 |
| R2 | CMC | 0:100 | 32 |

All the batteries T1, T2, and T3 have the same level of discharge rate ratio as those of the batteries R1 and R2, indicating that all the batteries have the same degree of discharge performance. As a result, it is confirmed that the battery that contains a mixture of CMC and the hydroxy group-modified PVP in the inorganic particle layer is capable of obtaining a similarly high level of discharge performance to the battery employing CMC alone.

In Examples and Comparative Examples of the present invention, the end-of-charge voltage of the batteries was set at 4.4 V (positive electrode potential: 4.5 V (vs. Li/Li$^+$)), but the end-of-charge voltage is not limited thereto. Specifically, in the batteries T1 to T3, the insulation performance between the positive and negative electrodes can be enhanced by employing the negative electrodes t1 and t3, respectively. Therefore, then the end-of-charge voltage is set at higher than 4.4 V, the effect of applying the invention will be more significant.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A lithium secondary battery comprising: a non-aqueous electrolyte; a positive electrode; and a negative electrode having a negative electrode mixture layer and an inorganic particle layer formed on the negative electrode mixture layer,
    the negative electrode mixture layer containing carboxymethylcellulose and a hydroxy group-modified polyvinyl pyrrolidone, and
    the mass ratio of the carboxymethylcellulose being greater than that of the hydroxy group-modified polyvinyl pyrrolidone.

2. The lithium secondary battery according to claim 1, wherein the hydroxy group-modified polyvinyl pyrrolidone comprises N-vinylpyrrolidone and 2-hydroxyethyl acrylate.

3. The lithium secondary battery according to claim 1, wherein the negative electrode mixture layer contains a binder made from a polymer latex.

4. The lithium secondary battery according to claim 1, wherein the total content of the carboxymethylcellulose and the hydroxy group-modified polyvinyl pyrrolidone in the negative electrode mixture layer is within a range of from 0.2 mass % to 2.0 mass %.

5. The lithium secondary battery according to claim 3, wherein the content of the binder in the negative electrode mixture layer is within a range of from 0.5 mass % to 2.0 mass %.

6. The lithium secondary battery according to claim 1, wherein the negative electrode mixture layer comprises a negative electrode active material, wherein the negative active electrode active material is at least one selected from the group consisting of artificial graphite, graphite, coke, tin oxide, metallic lithium and silicon.

* * * * *